UNITED STATES PATENT OFFICE.

MARC DARRIN, OF WILKINSBURG, PENNSYLVANIA, ASSIGNOR TO THE KOPPERS COMPANY, OF PITTSBURGH, PENNSYLVANIA, A CORPORATION OF PENNSYLVANIA.

RESIN.

1,326,579.     Specification of Letters Patent.     Patented Dec. 30, 1919.

No Drawing.     Application filed July 27, 1918. Serial No. 247,013.

*To all whom it may concern:*

Be it known that I, MARC DARRIN, a citizen of the United States, residing at Wilkinsburg, Allegheny county, State of Pennsylvania, have discovered a new and useful Resin, of which the following is a full, clear, and exact description.

My invention relates to a high melting resin, possessing acid, chemical and electrical resisting properties to a marked degree, made from crude solvent naphtha resulting from the recovery of benzol from tar, gas, or otherwise.

I have discovered that the resin produced by the heat treatment of crude solvent naphtha is superior and very different in its properties from ordinary paracoumarone resin as heretofore made by acid polymerization processes, and that a paint, varnish or other composition made up with this resin possesses very superior chemical, electrical and heat resisting properties. An example of heat treatment by means of which this resin may be produced, is disclosed in the Darrin Patent No. 1,236,917. Another example of a heat treatment under pressure by which this resin may be produced is disclosed in the Sperr and Darrin Patent No. 1,263,813.

Ordinary paracoumarone resin, made by acid polymerization processes, melts below 108° C. (usually about 80° C.), and has a tendency to gum or stick on grinding or after grinding. Ordinary paracoumarone resin also contains considerable ash due to the acid and alkali with which the crude solvent naphtha was washed, likewise it holds a trace either of acid or alkali depending upon which was used in excess during its manufacture. My new resin is absolutely neutral in character. Its melting point is as high as 135° C., it is far harder than paracoumarone resin, and can be easily ground without any tendency to stick or gum. It contains less than three-hundredths of one per cent. of ash, and less than six-hundredths of one per cent. of moisture and volatile matter.

Since the resin made by the new process comes in contact at no time during its manufacture with either acids or alkalis, it is readily seen that the absence of salts, which must be present when treated alternately with acid and alkali, increases its electrical resisting properties, as it is the salty and mineral matter in the resin which causes its electrical conductivity and final rupture. The color of the new resin is different from paracoumarone, having a clear, reddish tint, instead of a yellowish brown color.

Since paracoumarone resin and the new resin differ so markedly, not only in their method of preparation but also in their properties, it is evident that they are chemically different materials. This is readily accounted for by the difference in treatment. Although the starting point for the manufacture of both resins is crude solvent naphtha, the methods of polymerization are so different that it is highly improbable that the polymerization proceeds the same in each case, or even that the same componds are polymerized; in fact it is improbable that any of the compounds are polymerized to the same degree. It is undoubtedly a fact that some of the compounds polymerized by the acid treatment are not polymerized by the heat treatment. This is shown to be true, since the yield by heat treatment, for certain solvent naphthas, is always lower, than by acid polymerization. In such cases an additional yield of soft resin can be obtained by further acid treatment of the resulting distillate from the heat polymerization. In other instances I have obtained higher yields with the heat polymerization treatment than with the acid polymerization treatment. This shows that different constituents of the solvent naphtha are polymerized by the two different methods and that the resulting resin is undoubtedly chemically different. It is suggested, by way of explanation, that not only is the degree of polymerization different for the two processes, but that there is a differential or selective polymerization between the two processes; in other words, it is possible that certain methyl-coumarones which tend to polymerize to a sticky resin on acid polymerization are not so much affected by the heat treatment, whereas, substances such as hydro-indene which are practically unaffected by acid treatment are quickly polymerized to hard resins by heat treatment. It is easily conceivable that a resin containing a hydrogenated indene would be harder than a resin containing no hydrogenated bodies. Hydrogenated indenes are known to occur to an appreciable extent in crude solvent naphtha. It is recognized that they are not affected by concentrated sulfuric acid. However, they are known to resinify on long standing and it is undoubtedly a fact that the speed of this resinification is greatly increased by raising the temperature and pressure.

The chemical formula of one of the principal constituents of the new resin is $(C_8H_6O)_y$ as differentiated from ordinary acid polymerized para coumarone with the formula $(C_8H_6O)_x$. The formula of another important constituent of the new resin is $(C_9H_8)_y$ as differentiated from the ordinary acid polymerized para indene with formula $(C_9H_8)_x$. Another constituent of the new resin is polymerized hydro indene $(C_9H_{10})_y$.

In these formulas, the numerical values of $y$ are from 4 to 5, while the numerical values of $x$ are from 6 to 7. These formulas are to be so understood herein and in the appended claims.

These numerical values of $x$ and $y$ are based on molecular weight determinations according to Beckman's lowering of the freezing point method, benzene being used as the solvent. The results of these determinations show that the molecular weight of an acid polymerized coumarone resin was 785, whereas the molecular weight of the resin produced by heat treatment is only 575. The molecular weight of unpolymerized coumarone is 118, and that of indene 116.

For the purpose of scientifically differentiating the products of the polymerization of crude solvent naphtha by acid treatment, which acid polymerized compounds are ordinarily called para-compounds, I term these new substances produced by heat treatment of crude solvent naphtha, pyro-para-compounds, *i. e.*, pyro-para-coumarone, pyro-para-indene, pyro-para-hydro-indene, etc. The resinous product which is a mixture of these pyro-para-compounds I term pyro-para-coumarone-resin as differentiated from ordinary para-coumarone-resin.

From the foregoing detailed description of the invention, it will be clearly seen that I have discovered and produced a resin different in physical and chemical properties and composition from any known resin and that same can be made by the heat treatment of crude solvent naphtha substantially as described in United States Patents Nos. 1,236,917 and 1,263,813, above mentioned. The resin which I have discovered and produced possesses superior acid, chemical, electrical and heat-resisting properties, and the perfected resin is a new composition of matter complying in all points with the statements of my invention.

Having thus fully described my invention, what I claim as new and desire to secure by Letters Patent is as follows:

I claim:

1. A neutral resin obtained by the polymerization of compounds which occur in crude solvent naphtha by means of heat treatment, having a melting point above 108° C., of a clear reddish color, containing less than three-hundredths of one per cent. of ash, and less than six-hundredths of one per cent. of moisture and volatile matter.

2. A neutral resin obtained by subjecting crude solvent naphtha to heat treatment.

3. A neutral resin obtained by subjecting crude solvent naphtha to heat treatment, having a melting point above 108° C., and possessing a clear reddish color.

4. A neutral resin obtained by subjecting crude solvent naphtha to a heat treatment, the individual constituents of the crude solvent naphtha being polymerized selectively and to a different degree than accomplished by the ordinary acid polymerization process.

5. A resin one of whose principal constituents is the herein described compound having the formula, $(C_8H_6O)_y$, in which $y$ has a numerical value of from 4 to 5 as differentiated from the ordinary acid polymerized para-coumarone with the formula, $(C_8H_6O)_x$, in which $x$ has a numerical value of from 6 to 7.

6. A resin one of whose important constituents is the substance having the formula, $(C_9H_8)_y$, in which $y$ has a numerical value of from 4 to 5, as differentiated from the ordinary acid polymerized para-indene with the formula, $(C_9H_8)_x$, in which $x$ has a numerical value of from 6 to 7.

7. A resin one of whose constituents is polymerized hydro-indene.

In testimony whereof, I have hereunto set my hand.

MARC DARRIN.